July 22, 1952  E. R. ROSS  2,603,951
HYDRAULIC BRAKE ADJUSTER
Filed May 26, 1947
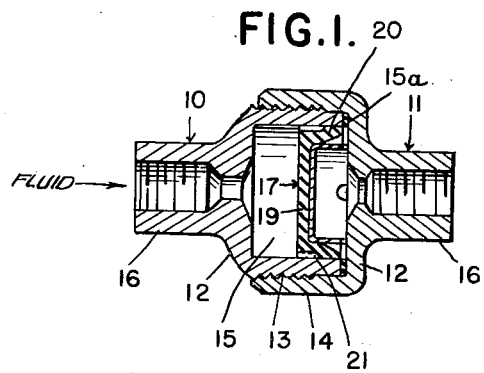
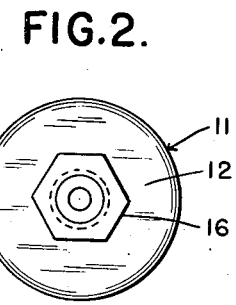
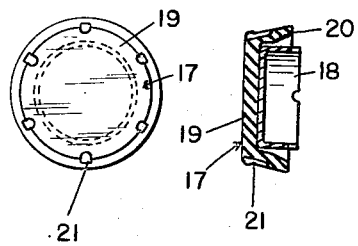
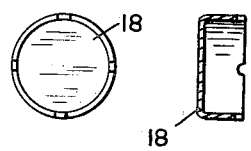
INVENTOR.
ELMER R. ROSS
BY
*Whittemore Hulbert & Belknap*
ATTORNEYS Patented July 22, 1952

UNITED STATES PATENT OFFICE 2,603,951

2,603,951
HYDRAULIC BRAKE ADJUSTER

Elmer R. Ross, Detroit, Mich., assignor to Kelsey-Hayes Wheel Company, Detroit, Mich., a corporation of Delaware Application May 26, 1947, Serial No. 750,573

1 Claim. (Cl. 60—54.5)

The invention relates to automatic adjusting means for use in connection with hydraulic brake systems and which compensate for wear of the brake lining.

It is the object of the invention to obtain an exceedingly simple construction of compensating means and to this end the invention consists in the construction as hereinafter set forth.

In the drawing:

Fig. 1 is a central longitudinal section through my improved compensator;

Fig. 2 is an end elevation thereof;

Fig. 3 is an axial section through the piston detached from the cylinder;

Fig. 4 is a rear elevation thereof;

Fig. 5 is an axial section through the rigid reinforcing cup for the piston; and Fig. 6 is an end elevation thereof.

The instant construction includes a casing forming therewithin a cylindrical chamber and connections at opposite ends thereof for incorporation in a hydraulic brake system. There is also a piston within the cylindrical chamber having a predetermined stroke and corresponding displacement of a predetermined volume of a fluid.

As illustrated 10 and 11, members of a two-part casing, each have a head portion 12 and a cylindrical flange portion, respectively, 13 and 14. These flange portions are threadedly engaged, the one within the other, to form a cylindrical chamber 15 sealed by a gasket 15a. The heads 12 are provided with couplings 16 for connection with suitable conduits (not shown) forming a portion of the hydraulic system. Within the cylindrical chamber 15 is a piston 17 which is composed of a rigid cup member 18, preferably a sheet metal stamping, and a flexible resilient cup 19 connected to and surrounding the cup 18. The flange 20 of the cup 19 is normally of flaring form and of a maximum diameter in excess of the internal diameter of the cylindrical flange 10. This flange 20 also tapers towards its largest end so that when the piston is placed within the chamber 15 it will form a sealing joint resisting passage of fluid in one direction. However, the flange 20 is sufficiently flexible and deformable to permit flow of fluid past the same in the opposite direction. The cup 19 is further provided with a plurality of grooves 21 distributed around the same and extending into the flange 20 for a portion of its length, thus facilitating the entrance of fluid and the compression of the flange. The rigid cup 18 forms a stop for limiting the movement of the piston so as to not injure the sealing flange 20. However, the free stroke of the piston will displace a predetermined volume of fluid from the chamber 15.

With the construction as above described, when the device is incorporated in a hydraulic brake system, fluid from a master cylinder flowing in the direction of the arrow will enter the chamber 15 and move the piston 17 to the right, Fig. 1, displacing a predetermined volume of fluid and forcing it into the brake operating motor. The volume of fluid displaced by the piston is sufficient to move the brake shoe or other brake friction means from a position clearing the cooperating brake surface to a position where full braking force is applied. However, as the lining wears the volume of fluid between the piston and the brake motor must be increased. This is ordinarily effected by the passage of the fluid over the periphery of the piston permitted by the collapsing of the flexible flange 20. It is not, however, possible for fluid to flow in the opposite direction around the piston as the flange 20 forms a seal.

The construction is exceedingly simple being composed of only five parts, viz., the two members 10 and 11 of the casing, the gasket 15a and the two members 18 and 19 of the piston. The flange 20 of the member 19 performs the function of a one-way valve which permits the flow of fluid past the piston in the direction from the master cylinder to the brake motor but prevents all passage of fluid in the opposite direction. Thus, while fluid for applying the brake can freely pass the piston, movement in the opposite direction is restricted to that which will release the brake with the desired clearance. The adjuster may be located at any convenient point in the system between the pistons of the brake cylinders and the displacement piston of the master cylinder.

What I claim as my invention is:

A hydraulic brake adjuster comprising a casing having a chamber and passages for fluid opening into opposite ends of the chamber and a piston movable within said chamber for the displacement of a predetermined volume of fluid, said piston comprising a cup-shaped sheet metal stamping and a cup-shaped flexible sealing member having its bottom extending over the bottom of said stamping and its flange encircling and of less length than the flange of said stamping, said cup-shaped stamping having the free edge of its flange engageable with an end of the chamber and notched to provide for passage of the fluid and said sealing member having longitudinal grooves in its outer face extending into its flange, the flange of said sealing member being tapered toward its free edge and having the portion beyond the grooves normally in sealing engagement with the wall of said chamber and clearing the flange of said stamping.

ELMER R. ROSS.

REFERENCES CITED

The following references are of record in the file of this patent:

UNITED STATES PATENTS

| Number | Name | Date |
|---|---|---|
| 2,156,120 | La Brie | Apr. 25, 1939 |

FOREIGN PATENTS

| Number | Country | Date |
|---|---|---|
| 157,887 | Austria | Feb. 10, 1940 |